No. 826,892. PATENTED JULY 24, 1906.
J. B. SECOR.
PLATEN SHIFT MECHANISM FOR TYPE WRITING MACHINES.
APPLICATION FILED SEPT. 10, 1904.
5 SHEETS—SHEET 2.
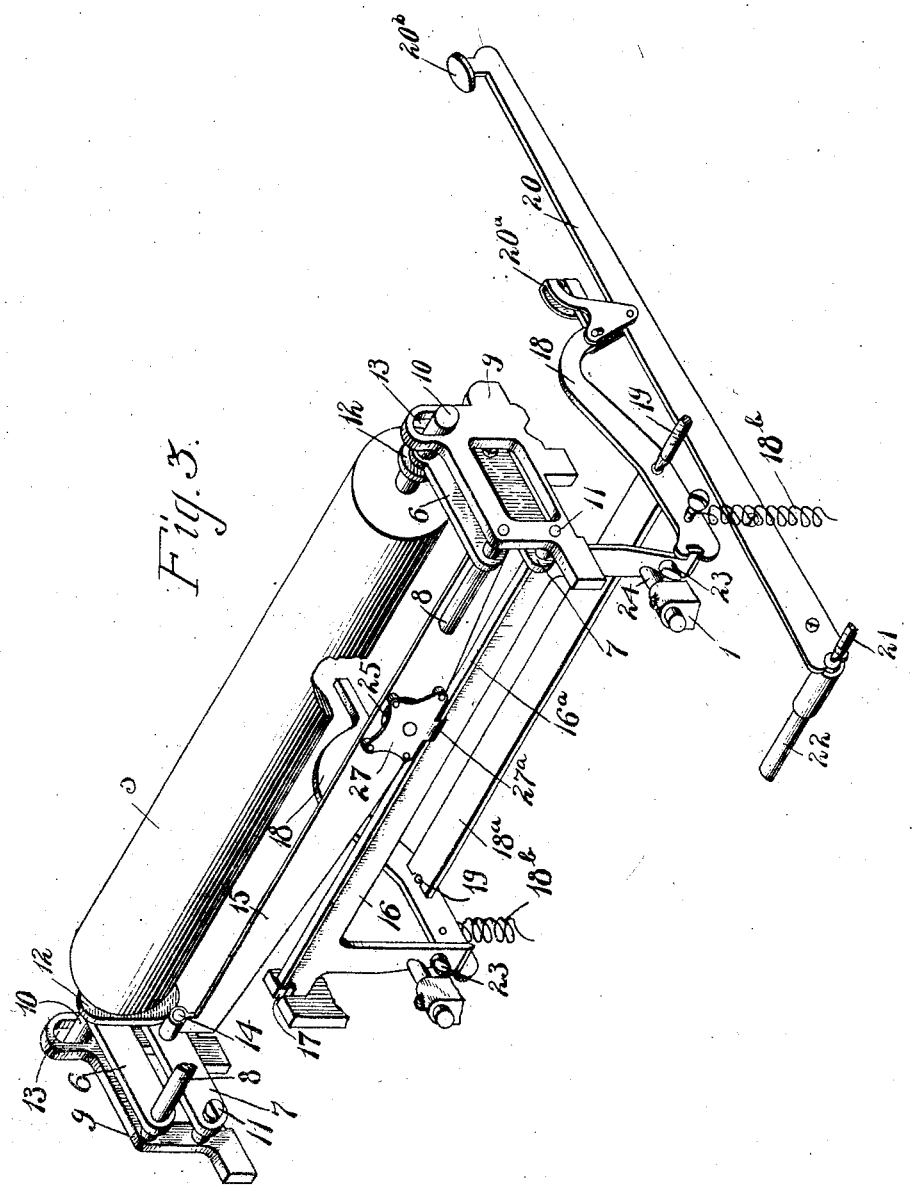
Witnesses
S. J. Hoexter
Jerome B. Secor
Inventor
By his Attorneys Knight Bro.

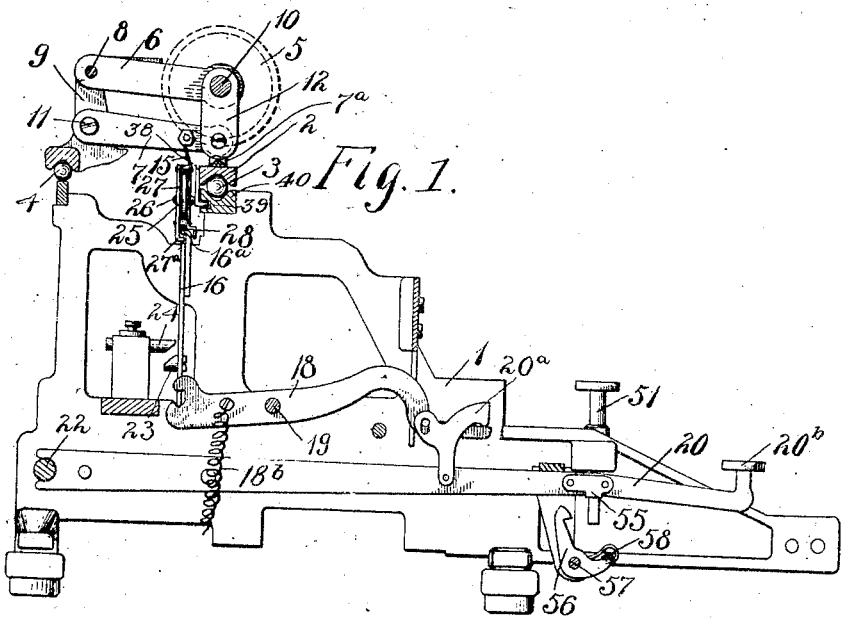

No. 826,892. PATENTED JULY 24, 1906.
J. B. SECOR.
PLATEN SHIFT MECHANISM FOR TYPE WRITING MACHINES.
APPLICATION FILED SEPT. 10, 1904.
5 SHEETS—SHEET 3.
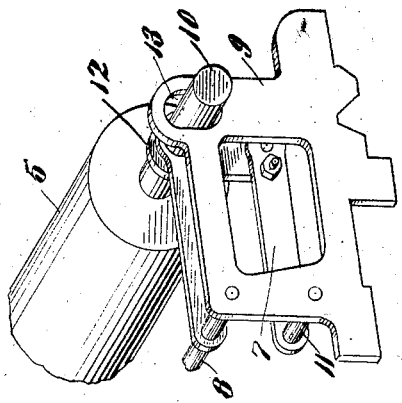
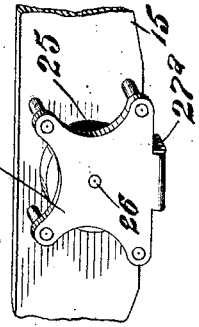
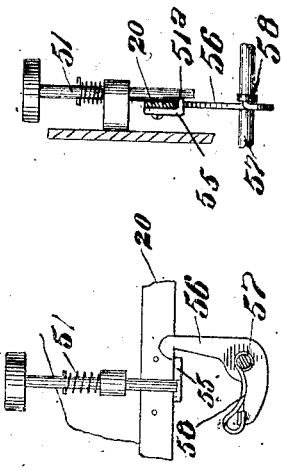
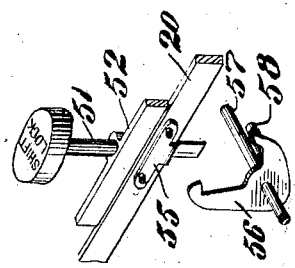
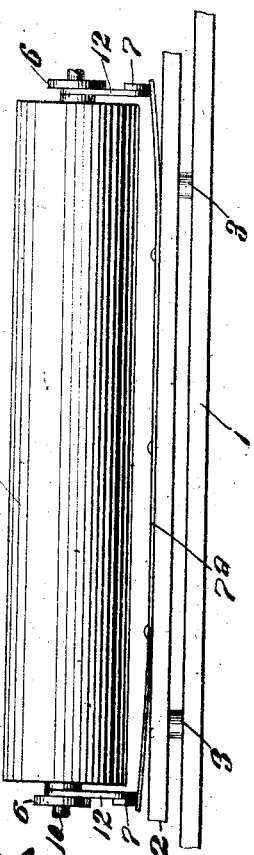
WITNESSES
Nathan Cohen
William Spanboch
INVENTOR
Jerome B. Secor.
BY Knight & Bros
ATTORNEYS No. 826,892. PATENTED JULY 24, 1906.
J. B. SECOR.
PLATEN SHIFT MECHANISM FOR TYPE WRITING MACHINES.
APPLICATION FILED SEPT. 10, 1904.

5 SHEETS—SHEET 4.

Witnesses
S. J. Foster
Geo. A. Kosbruch

Jerome B. Secor
Inventor
By his Attorneys
Knight Bros

No. 826,892. PATENTED JULY 24, 1906.
J. B. SECOR.
PLATEN SHIFT MECHANISM FOR TYPE WRITING MACHINES.
APPLICATION FILED SEPT. 10, 1904.

5 SHEETS—SHEET 5.

Witnesses
S. J. Hoepler
Chs. A. Kostrich

Jerome B. Secor,
Inventor
By His Attorneys Knight Bro.

UNITED STATES PATENT OFFICE.

JEROME B. SECOR, OF DERBY, CONNECTICUT, ASSIGNOR TO THE WILLIAMS TYPEWRITER COMPANY, OF DERBY, CONNECTICUT, A CORPORATION OF IOWA.

PLATEN-SHIFT MECHANISM FOR TYPE-WRITING MACHINES.

No. 826,892.

Specification of Letters Patent.

Patented July 24, 1906.

Application filed September 10, 1904. Serial No. 224,045.

*To all whom it may concern:*

Be it known that I, JEROME B. SECOR, a citizen of the United States, and a resident of Derby, in the county of New Haven and State of Connecticut, have invented certain new and useful Improvements in Platen-Shift Mechanism for Type-Writing Machines, of which the following is a specification.

The object of my present invention is to provide certain improvements in platen-shift mechanism for type-writing machines wherein the platen is constructed to be shifted vertically and independently of the carriage upon which it is mounted and wherein said platen is held in its shifted position while the carriage is progressed step by step and wherein mechanism is provided to accomplish these results without friction between the parts to interfere with the free travel of the carriage.

Further objects of my invention are to provide an improved shift-lock which may be employed in connection with the shift mechanism herein shown and described.

Further objects of my invention are to provide slight modifications in the structure referred to.

Such improvements are fully described in the following specification and clearly shown in the accompanying drawings, in which like reference-numerals refer to like parts, and in which—

Figure 10:
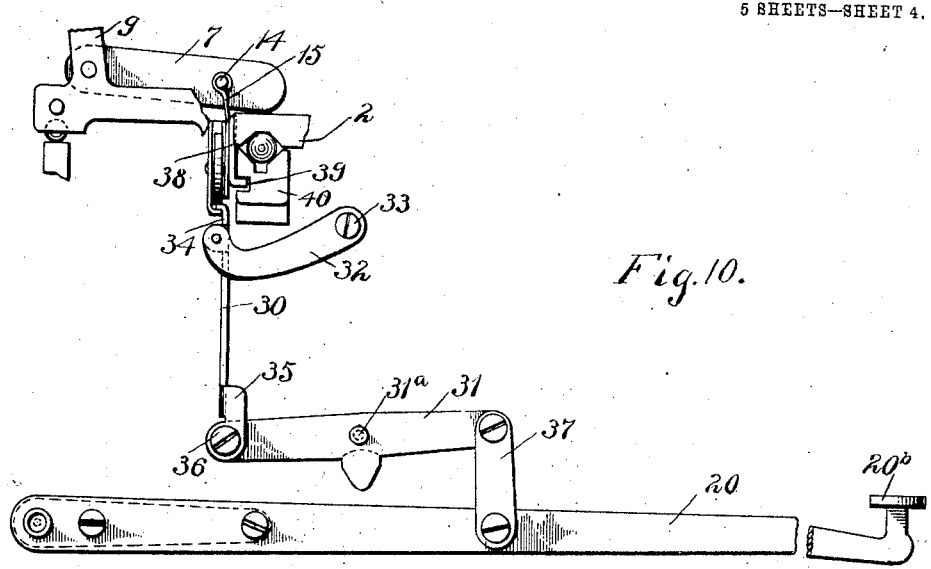
Figure 11:
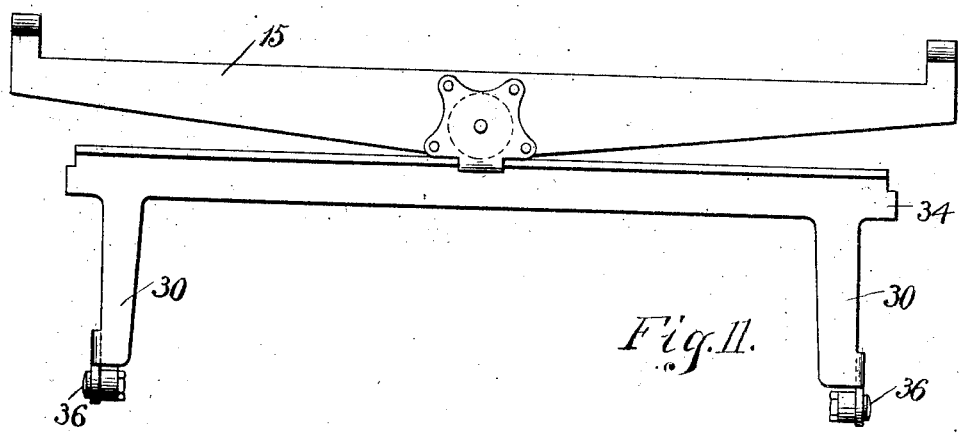
Figure 12:
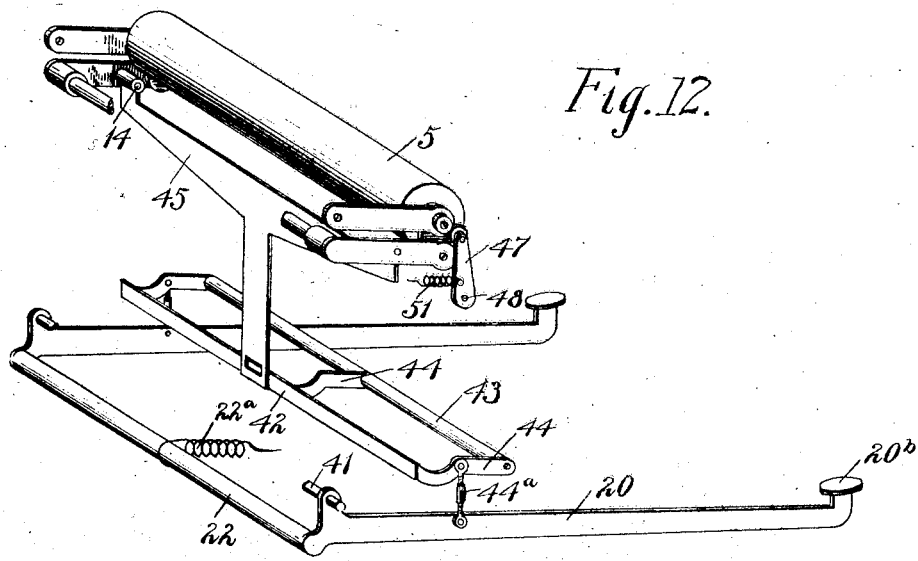
Figure 13:
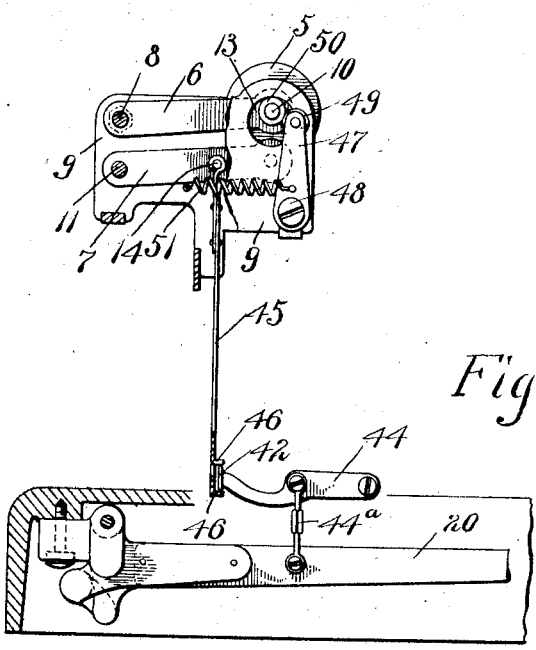

Figure 1 is a sectional side elevation of a type-writing machine embodying the preferred form of my improved shift mechanism. Fig. 2 is a rear elevation of the platen-shifting frame, the swinging frame, forming a part of said mechanism, and a portion of the machine and showing the connection between the two frames. Fig. 3 is a general perspective view of the preferred form of my shift mechanism removed from the machine-frame. Fig. 4 is a front elevation of the platen, the parallel platen-links and counterbalance-spring upon which the same is mounted, and a portion of the carriage and machine-frame. Fig. 5 is a detail perspective view of a portion of the carriage-frame, two of the platen-links, and a portion of the platen, illustrating the method of mounting the platen upon the platen-carriage. Fig. 6 is a detail perspective view of the antifriction connection between the platen-shifting frame and the swinging frame carried by the lower platen-links, showing also a portion of said swinging frame. Fig. 7 is a detail perspective view of the shift-lever, showing a part of my improved platen-shift mechanism. Fig. 8 is a sectional side elevation of the same. Fig. 9 is a sectional front elevation of the same. Fig. 10 is a side elevation of my improved shift mechanism, showing slight modifications in the shifting-frame guides and the connection between said frame and the shifting sublevers, showing also a portion of the carriage. Fig. 11 is a rear elevation of the same, the carriage being removed. Fig. 12 is a perspective view of another form of my improved shift mechanism, in which the platen is held normally in an elevated position and is shifted by a depression; and Fig. 13 is a sectional side elevation of a portion of the same.

Only so much construction of a type-writing machine is illustrated in the foregoing views as is necessary to clearly explain my invention.

Referring now in detail and particularly to the platen-shift device shown in Figs. 1, 2, 3, 4, and 5 of the drawings, 1 represents the frame of a type-writing machine, upon which is mounted to travel a carriage 2 on suitable ball-bearings 3 4, carrying the platen 5, mounted upon parallel platen-links 6 7. Links 6 are pivoted at one end to the rear bar 8, connecting the side plates 9 of the platen-carriage 2, and at their other or platen ends to the platen-shaft 10. Links 7 are pivoted at one end to studs 11, seated in the end plates 9 of the carriage 2, and at their other end to vertical links 12, which are pivotally hung on the platen-shaft 10 between the platen 5 and link 6. The shaft 10 of the platen is extended at each end into a slot 13 in the end plates 9 for purposes hereinafter described. Pivoted on studs 14, seated in links 7, is a swinging frame 15. 16 is a shifting-frame sliding in guide grooves or notches 17 in the machine-frame and fulcrumed at its lower end to sublever 18, pivoted to the machine-frame 1 on pivots 19, seated in said frame 1. Sublevers 18 are connected to move in unison by bar 18ª. 20 represents shift-levers fulcrumed at their rear ends to pivots 21, seated in the frame 1 of the machine. Levers 20 are connected to move in unison by a bar 22. 20ª represents forked links straddling the sublevers 18 and pivoted to the shift-levers 20. Links 20ª are adapted to bear during operation at two different points on sublevers 18, so that there will be first a greater leverage exerted on levers 18 and then a lesser leverage, thus easing the touch and making a less jerky movement. Frame 16 carries a lug or projection 23 at each side adapted to engage a stop pin or projection 24, seated in a portion of the frame 1 of the machine. 25 is an antifriction-roller pivoted on a stud 26, seated in the swinging frame 15 and a keeper-plate 27, secured to the frame 15, which plate 27 is provided with a lug or projection 27ª, bent to engage the under side of a track-flange 16ª on the shifting-frame 16. Antifriction-roller 25 travels on track-flange 16ª. 28 is a lug or projection on the swinging frame 15, engaging the opposite side of the shifting-frame 16 from that engaged by the lug or projection 27ª. Lugs or projections 27ª and 28 prevent automatic disconnection between the swinging frame 15 and the shifting-frame 16 during course of travel of the carriage upon the machine-frame.

The operation of the mechanism thus far described is as follows: The depression of either one of the shift-levers 20 will depress the other, draw down the straddling links 20ª, the forward ends of the sublevers 18 elevating their rear ends, forcing the shifting-frame 16 upwardly until stopped by stops or projections 24 engaging stops or projections 23, and forcing swinging frame 15, links 7, vertical links 12, and the platen 5 up until the platen is stopped by an engagement of the shaft 10 of said platen with the upper ends of the slots 13. In the two positions occupied by the platen the shaft 10 occupies a plane above and a plane below, respectively, equidistant from the plane of the rear bar 8.

In order to reduce friction between the shifting-frame 16 and the swinging frame 15 and ease the touch of the shift-levers 20, I have provided a band-spring 7ª, secured to the frame of the carriage and to the platen ends of the links 7. Spring 7ª counterbalances the weight of the platen 5 and the parts lifted therewith, and hence it takes weight off of frames 15 and 16, thereby greatly reducing the friction between frame 16 and the antifriction-roller 25, and thus reducing the weight to be overcome by the finger in shifting the case. Connected to either or both of sublevers 18 is a spring 18ᵇ, connected at its other end to a portion of the machine-frame 1 and resisting the raising of the rear end of sublever 18.

Springs 7ª and 18ᵇ may be so tensioned that the normal position of the platen will be such that the antifriction-rollers 25 will bear but lightly upon the frame 16, so that friction between said rollers and frame will be nominal. Upon the tension of spring 18ᵇ depends the softness or hardness of the touch of the key-lever.

In the mechanism thus far described the platen rests normally in its lowermost position and is elevated to shift the same to its capital or upper-case position. In view of this fact there is a tendency of the carriage to be lifted from its track. I therefore provide a keeper-plate 38, mounted on the platen-carriage and bent at its lower end to engage the groove 39 in the track-bar 40, Fig. 1. Keeper-plate 38 will prevent vertical displacement of the carriage upon depression of either of the shift-levers 20.

Referring now to the shift-lever-locking mechanism, (shown in Figs. 1, 7, 8, and 9,) 51 represents an auxiliary shift-key slidably mounted in a bracket 52, mounted on the machine-frame 1, the shank of said shift-key being cut away to form a shoulder 51ª, adapted to engage a keeper 55, secured to the side of the shift-lever 20 and bent under said shift-lever 20 into the path of reciprocation of the key 51. Positioned beneath the key 51 is a trigger 56, mounted on a pivot-bar 57, journaled in the machine-frame and held normally in upright position by a spring 58 engaging the lower or short arm of said trigger 56. The head of the trigger 56 is in the same vertical plane with the keeper 55, while the short arm of the trigger 56 is in the same vertical plane with the narrow portion of the lower end of the shank of the key 51.

In operation upon depression of the shift-lock key the shoulder 51ª on the shank of said key 51 engages the trigger-keeper 55, which being rigidly mounted upon the shift-lever 20 carries said lever 20 to its shifted position. In the meantime the lower end of the shank of the key 51 continuing downwardly engages the short frame of the trigger 56 and by pressing on the short arm of said trigger throwing the head of the trigger 56 forward until the same is in line of engagement with keeper 55. Shift-lock key 51 is then released, allowing the lever 20 to ascend until it engages the head of the trigger 56. The tendency of the spring engaging the short arm of the trigger 56 being to force the head of said trigger away from keeper 55, the head of the trigger 56 is held in engagement with keeper 55 solely by friction. The trigger 56 is released from its locking engagement through means of a subsequent depression of a shift-lever 20 by the main shift-key 20ᵇ. Such depression disengages the head of the trigger 56 from keeper 55 long enough to allow the spring engaging the short arm of the trigger 56 to throw the said trigger backward out of the path of the keeper 55. The shift-lock device just described is illustrated in connection with a front-strike type-writing machine; but it will be obvious that the same may be applied to any form of machine.

In Figs. 10 and 11 I have illustrated slight modifications in the form of platen-shift mechanism heretofore described, consisting principally in modified means for guiding the platen-shifting frame (in said figures numbered 30) and in the means for connecting the sublevers 31 thereto. In such modified construction I employ a pair of guide-links 32, pivoted to studs 33, seated in the machine-frame, and to lugs or ears 34 on the shifting-frame 30. In the drawings I have shown but one link 32, Fig. 10; but there are two of said links, one mounted on each side of the machine-frame. Links 32 are substituted in this construction for the grooves or notches 17, Fig. 3, and serve to limit the shifting-frame 30 to a substantially vertical movement. At its lower end the shifting-frame 30 is pivotally connected, through means of lugs 35, to studs 36, seated in sublevers 31, mounted on pivots 31$^a$. Sublevers 31 are connected to shift-levers 20 through means of links 37. Shifting-frame 30 is constructed in other respects than those stated similarly to shifting-frame 16 and is connected to swinging frame 15 in the same manner as shifting-frame 16 is connected thereto. The operation of this form of platen-shift mechanism is identical with the operation of that already described, and hence needs no further description.

Referring now to the form of shift mechanism shown in Figs. 12 and 13, I have shown a platen-shifting mechanism which operates reversely to the two forms of platen-shift mechanism heretofore described—that is, therein the platen is normally in its elevated position and is depressed to shift the same to its capital or upper-case position. In this mechanism which employs the two shift-levers 20, connected by the bar 22 and pivoted to a pivot-bar 41, journaled in the machine-frame 1 and extending transverse the machine, Fig. 12, the shift-levers 20 are connected directly to a shifting-frame comprising the pivot-bar 43, pivotally mounted in the machine-frame 1, and a track-bar 42, bars 42 and 43 being connected by braces 44. The connection between shift-levers 20 and the platen-shifting frame in this instance consists in adjustable buckle-rods 44$^a$ 45 in a swinging frame pivoted to studs 14 on links 7 in like manner to swinging frame 15. Frame 45 is extended down to the horizontal plane of track-bar 42, to which it is connected by lugs or projections 46 and along which it slides. 47 represents pivoted antifriction-latches, one at each end of the platen, pivoted to studs 48, seated in the end plates 9 of the carriage and carrying at their upper ends antifriction-rollers 49, which bear against disks 50, mounted on the platen-shaft 10. Latches 47 are connected by springs 51 to end plates 9. The antifriction-rollers 49 are so positioned on latches 47 as to bear against the upper sides of disks 50 when the platen is in its depressed position and to bear against the lower surface of said disk when the platen is in its normal or elevated position. Springs 51 draw latch 47 toward shaft 10 and hold roller 49 in contact with the surface of the disk 50. In operation either one of the shift-levers 20 are depressed, drawing down the buckle-rods 44$^a$, depressing the platen-shifting frame 42 43 44, drawing down the swinging frame 45 and platen 5. The latches 47 hold the platen 5 in its depressed or shifted position, and thereby relieve the frame 45 and bar 42 from friction. They likewise hold platen 5 in elevated position, and thereby again relieve the parts from friction when the platen is traveling in its normal position. Upon depression of a shift-lever 20, the platen 5 being drawn down, antifriction-roller 49 passes over the surface of the disk 50 to the upper surface thereof in opposition to spring 51, the roller 49 being returned to its normal position by the jar of the parts incident to the release of the shift-levers 20, the resistance of springs 51 is overcome by the hand of the operator, and upon release of said lever the same is overcome by the impetus in the ascent of frame 45. Previous to either of said movements latch 47 is in effective position. Latches 47 perform substantially the same function that spring 7$^a$ in Fig. 4 performs—that is, they balance the weight of the platen and the parts that have to be lifted therewith, thus reducing the weight to be overcome by the finger in shifting the case, and thereby making the touch light. The combination of spring 22$^a$ with latches 47 gives a light and smart action to the shift.

If desired, the several forms of connection between the swinging frames and shifting-frames may be transposed—such, for instance, as the use of the form of connection shown in Fig. 6 on the structure shown in Figs. 12 and 13, and vice versa.

Having thus described my invention, what I claim as new therein, and desire to secure by Letters Patent, is—

1. In a platen-shift mechanism for writing-machines, the combination with a machine-frame and the carriage mounted to travel thereon, of a shiftable platen, a movable frame for shifting said platen, means for guiding said frame in its movement, means for moving said frame, a swinging frame suitably connected to the platen, and a suitable anti-friction interlocking connection between said shifting and swinging frames.

2. In a platen-shift mechanism for writing-machines the combination with a machine-frame and a platen-carriage mounted to travel upon said frame, of parallel pairs of links pivotally mounted on said carriage, a platen mounted on one of said pairs of links, a frame swinging from the other of said pairs of links, means for connecting the pairs of links to insure movement in unison, a key-lever-operated shifting-frame, and a traveling antifriction interlocking connection between said shifting and swinging frames.

3. In a platen-shift mechanism for writing-machines, the combination with a machine-frame and a platen-carriage mounted to travel upon said frame, of parallel pairs of links pivotally mounted on said carriage, a platen mounted on one of said pairs of links, a frame swinging from the other of said pairs of links, means for connecting the pairs of links to insure movement in unison, a key-lever-operated shifting-frame, return-springs opposing the movement of said shift-frame, and a traveling antifriction interlocking connection between the shifting and swinging frames.

4. In a platen-shift mechanism for writing-machines, the combination with a machine-frame and a carriage mounted to travel on said frame, of a platen movable independently of said carriage, a key-lever-actuated shifting-frame, a swinging frame carried by the platen, an antifriction-roller on said swinging frame and traveling on said shifting-frame and a housing for said roller having an extension thereon interlocking with said shifting-frame to prevent disengagement of the parts.

5. In a machine of the character described, the combination with a platen, a main lever and a sublever for actuating said platen; of a connection between the main lever and sublever, so connected to the sublever that it will act upon said sublever first at a point remote from the fulcrum of said sublever and then at a point nearer said fulcrum.

6. In a machine of the character described, the combination with a lever having a suitable key, of an auxiliary key for depressing said lever, movable independently of said lever and permitting movement of the lever independently of it, a trigger for locking said lever actuated by said auxiliary key and a keeper for said trigger.

7. In a machine of the character described, the combination with a lever, having a suitable key, of an auxiliary key movable independently of said lever and permitting movement of said lever independently of it, a trigger pivoted beneath said lever and actuated by said auxiliary key, a keeper on said lever and means for returning the parts to normal position.

8. In a machine of the character described the combination of a suitable platen, and a shift-lever and movable connections between the platen and the shift-lever; of a stop movable vertically with said connections, a horizontally-movable stop mounted on the machine-frame, adapted to be projected into and out of the path of movement of said stop on the connections to regulate the shifting of the platen and means for holding said horizontally-movable stop in adjusted position.

9. In a machine of the character described having a suitable platen, the combination of a pair of main levers connected at their ends to move in unison, a pair of sublevers connected to said main levers and connected to move in unison and means connected to said sublevers for shifting said platen.

10. In a machine of the character described having a suitable platen, the combination with a sublever connected to said platen, spring means for holding said sublever in normal position, a suitable pivoted main lever and a link connecting the two levers and holding said main lever in normal position.

11. In a machine of the character described the combination with a suitable platen, a spring for returning said platen to normal position, a counterbalance-spring opposing said return-spring, a shift-lever and suitable connections between the shift-lever and platen for shifting the platen.

12. In a machine of the character described, the combination with a suitable platen, a shift-lever connected to said platen and a spring for returning the parts to normal position, of a spring extending beneath the platen and bearing upwardly against the platen-mounting to counterbalance said spring.

JEROME B. SECOR.

Witnesses:
  J. P. CLARKE,
  C. E. BEARDSLEY.